US008478467B2

(12) United States Patent
Tang

(10) Patent No.: US 8,478,467 B2
(45) Date of Patent: Jul. 2, 2013

(54) METHOD AND APPARATUS FOR CONTROLLING OUTPUT TORQUE OF A MOTOR FOR AN ELECTRIC VEHICLE IN UPHILL MODE

(75) Inventor: Xiaohua Tang, Guangdong (CN)

(73) Assignee: BYD Co. Ltd., Shenzhen (CN)

( * ) Notice: Subject to any disclaimer, the term of this patent is extended or adjusted under 35 U.S.C. 154(b) by 937 days.

(21) Appl. No.: 12/520,168

(22) PCT Filed: Dec. 26, 2007

(86) PCT No.: PCT/CN2007/071336
§ 371 (c)(1),
(2), (4) Date: Jun. 19, 2009

(87) PCT Pub. No.: WO2008/077352
PCT Pub. Date: Jul. 3, 2008

(65) Prior Publication Data
US 2010/0030415 A1 Feb. 4, 2010

(30) Foreign Application Priority Data

Dec. 26, 2006 (CN) .......................... 2006 1 0157732

(51) Int. Cl.
*B60L 15/20* (2006.01)
(52) U.S. Cl.
CPC ......... *B60L 15/2063* (2013.01); *B60L 15/2081* (2013.01)
USPC ........................... 701/22; 701/99; 180/65.285
(58) Field of Classification Search
USPC .................................................. 701/22
See application file for complete search history.

(56) References Cited

U.S. PATENT DOCUMENTS 5,457,363 A * 10/1995 Yoshii et al. .................. 318/432
5,533,583 A * 7/1996 Adler et al. ............... 180/65.245

(Continued)

FOREIGN PATENT DOCUMENTS

CN 1778601 5/2006
CN 1778601 A 5/2006

(Continued)

OTHER PUBLICATIONS

International Search Report dated Mar. 17, 2008 issued in related PCT Application, International Publication No. WO 2008/077352.

(Continued)

*Primary Examiner* — Shelley Chen
(74) *Attorney, Agent, or Firm* — Brinks Hofer Gilson & Lione

(57) ABSTRACT

A method and an apparatus for controlling output torque of a motor for an electric vehicle in uphill mode, the method comprises: detecting a tilt angle value U, a current vehicle speed value V and an accelerator-pedal travel value Gain of the vehicle, determining whether the vehicle is in uphill mode or not, and if the result is positive, then calculating a minimum torque T1 required for preventing the vehicle from slipping backward under the tilt angle value 0 and the current vehicle speed value V, obtaining a maximum output torque T2, calculating an output torque T of the motor based on T1, T2 and Gain, and controlling the motor to output the calculated output torque T. With the method and apparatus in accordance with the present invention, when the electric vehicle is in uphill mode, even if the accelerator-pedal travel value is zero, the vehicle will not slip backward.

11 Claims, 3 Drawing Sheets

U.S. PATENT DOCUMENTS

| | | | |
|---|---|---|---|
| 5,793,175 A | 8/1998 | Journey | |
| 6,377,007 B1 * | 4/2002 | Ozaki et al. | 318/432 |
| 7,962,256 B2 * | 6/2011 | Stevens et al. | 701/22 |
| 2002/0088653 A1 | 7/2002 | Takamoto et al. | |
| 2006/0238023 A1 * | 10/2006 | Hommi | 303/151 |
| 2008/0039990 A1 * | 2/2008 | Stevens et al. | 701/22 |
| 2010/0004808 A1 * | 1/2010 | Tang et al. | 701/22 |

FOREIGN PATENT DOCUMENTS

| | | |
|---|---|---|
| CN | 1829625 | 9/2006 |
| CN | 1829625 A | 9/2006 |
| CN | 101209682 A | 7/2008 |
| EP | 2097291 | 7/2008 |
| JP | FR2756521 | 6/1998 |
| JP | FR 2756521 A1 | 6/1998 |
| JP | 3608799 | 1/2005 |
| WO | WO 98/41417 | 9/1998 |
| WO | WO 98/41417 A1 | 9/1998 |
| WO | WO 2008/077352 A1 | 7/2008 |

OTHER PUBLICATIONS

Office Action dated Jul. 10, 2009 issued in related Chinese Patent Application No. 2006101577327.

* cited by examiner

METHOD AND APPARATUS FOR CONTROLLING OUTPUT TORQUE OF A MOTOR FOR AN ELECTRIC VEHICLE IN UPHILL MODE

CROSS-REFERENCE TO RELATED APPLICATIONS

This application is a national phase application of PCT Application No. PCT/CN2007/071336 filed Dec. 26, 2007, which claims priority from Chinese Patent Application No. 2006-10157732.7, filed Dec. 26, 2006, both contents of which are incorporated herein by reference in their entirety.

FIELD OF INVENTION

The present invention relates to a method and apparatus for controlling output torque of a motor for an electric vehicle, and more particularly, to a method and apparatus for controlling output torque of a motor for an electric vehicle in uphill mode.

BACKGROUND

The conventional fuel vehicle adopts an engine as the power output source, in order to keep the engine does not missfire the running speed of the engine must beyond an idle speed. When the vehicle is on the slope section, even if the driver does not step on the accelerator pedal, since the engine runs under a speed beyond the idle speed, the engine may also give a forward moment to ensure the vehicle will not slip backward. And most of the electric vehicles adopt a motor as the power output source, the output torque T of the motor may be calculated by the vehicle control unit according to equation $T=T_2 \times Gain$ where $T_2$ is the maximum output torque of the motor under current vehicle speed value, and Gain is the accelerator-pedal travel value which is in the range of 0%~100% and the value of Gain is proportional to the step depth of the accelerator pedal. The motor may drive the wheels with the calculated torque to ensure the vehicle reach the required speed. The motor itself does not need an idle speed to ensure the running of the vehicle, so when the driver does not step on the accelerator pedal, the motor has no output torque. However, when the electric vehicle is on a slope section, if the driver releases the accelerator pedal, since there has no output torque given by the motor, the vehicle may slip backward, thus may cause serious accidents, so it is desired to provide a method and apparatus in order to prevent the vehicle from slipping backward in uphill mode.

SUMMARY OF INVENTION

In order to solve the foresaid problems, the present invention provides a method and apparatus for controlling output torque of a motor for an electric vehicle in uphill mode, therefore controls the motor provides an output torque in uphill mode according to the vehicle conditions, prevents the vehicle from slipping backward, and thus improve the vehicles' security and comfort.

In order to realize the foresaid purpose, the present invention provides a method for controlling output torque of a motor for an electric vehicle in uphill mode, and the method comprises the following steps:

S1) detecting a tilt angle value $\theta$, a current vehicle speed value V and an accelerator-pedal travel value Gain of the vehicle;

S2) determining whether the vehicle is in uphill mode or not, and if yes going to step S3, otherwise going to step S4;

S3) calculating a minimum torque $T_1$ required for preventing the vehicle from slipping backward under the tilt angle value $\theta$ and the current vehicle speed value V, obtaining a maximum output torque $T_2$ of the motor under the current vehicle speed value V, calculating an output torque T of the motor based on the minimum torque $T_1$, the maximum output torque $T_2$ and the accelerator-pedal travel value Gain, and going to step S5;

S4) obtaining a maximum output torque $T_2$ of the motor under the current vehicle speed value V, calculating an output torque T of the motor based on the maximum output torque $T_2$ and the accelerator-pedal travel value Gain, and going to step S5; and S5) controlling the motor to output the calculated output torque T.

In one embodiment, in step S3, the minimum torque $T_1$ is calculated according to the following equation: $T_1 = -T_0$, wherein $$T_0 = mg\sin\theta \times \frac{r}{k},$$

m is total mass of the vehicle, g is the gravity acceleration, $\theta$ is the tilt angle value of the vehicle, r is radius of the wheels and k is a variable transmission ratio of the gearbox. The maximum output torque $T_2$ may be consulted from the external characteristic curve of the motor according to the current vehicle speed value V of the vehicle.

In another embodiment, in step S3, further comparing the current vehicle speed value V with a speed threshold $V_0$ and 0 respectively, and the minimum torque $T_1$ can be calculated according to the result of comparisons and the following equation:

$$T_1 = \begin{cases} 0; & \text{if } V > V_0 \\ -\left(1 - \frac{V - V_0}{V_0}\right) \times T_0; & \text{if } 0 \leq V \leq V_0 \\ -T_0; & \text{if } V < 0 \end{cases}$$

wherein $$T_0 = mg\sin\theta \times \frac{r}{k},$$

m is total mass of the vehicle, g is the gravity acceleration, $\theta$ is the tilt angle value of the vehicle, r is radius of the wheels and k is a variable transmission ratio of the gearbox.

The speed threshold $V_0$ is 10 km/h.

According to the method of the present invention, the output torque T of the motor in step S3 may be calculated according to the equation $T = T_1 + (T_2 - T_1) \times Gain$, and the output torque T of the motor in step S4 is calculated according to the equation $T = T_2 \times Gain$.

According to the method of the present invention, wherein in step S2, determining the vehicle is in uphill mode when the detected tilt angle value $\theta$ is positive.

According to the method of the present invention, wherein in step S1 further detecting a current gear position of the vehicle, and in step S2, besides determining whether the vehicle is in uphill mode or not, further determining whether the current gear position is at forward gear or neutral or otherwise, and if the vehicle is in uphill mode and the current gear position is at forward gear or neutral, then going to step S3, otherwise going to step S4.

In order to realize the foresaid purpose, the present also provides an apparatus for controlling output torque of a motor for an electric vehicle in uphill mode, comprising: an angle sensor, for detecting tilt angle of the vehicle and outputting a tilt angle signal to a motor controller; a vehicle speed sensor, for detecting current speed of the vehicle and outputting a vehicle speed signal to the motor controller; an accelerator-pedal position sensor, for detecting position of the accelerator-pedal and outputting an accelerator-pedal position signal to the motor controller; and the motor controller, configured to:

receive the tilt angle signal, the vehicle speed signal and the accelerator-pedal position signal, obtain a tilt angle value $\theta$, a current vehicle speed value V and an accelerator-pedal travel value Gain for the vehicle based on the signals, determine whether the vehicle is in uphill mode or not:

if the vehicle is in uphill mode, then calculate a minimum torque $T_1$ required for preventing the vehicle from slipping backward under the tilt angle value $\theta$ and the current vehicle speed value V, obtain a maximum output torque $T_2$ of the motor under the current vehicle speed value V, calculate an output torque T of the motor based on the minimum torque $T_1$, the maximum output torque $T_2$ and the accelerator-pedal travel value Gain; or if the vehicle is not in uphill mode, then obtain a maximum output torque $T_2$ of the motor under the current vehicle speed value V, calculate an output torque T based on the maximum output torque $T_2$ and the accelerator-pedal travel value Gain; and generate a control signal for controlling the motor to output the calculated output torque T.

In one embodiment, the motor controller comprises: a calculating unit, configured to calculate the minimum torque $T_1$ according to the following equation $T_1 = -T_0$, wherein $$T_0 = mg\sin\theta \times \frac{r}{k},$$

m is total mass of the vehicle, g is the gravity acceleration, $\theta$ is the tilt angle value of the vehicle, r is radius of the wheels and k is a variable transmission ratio of the gearbox.

In another embodiment, the calculating unit is further configured to calculate the output torque T as follows: if the vehicle is in uphill mode, then the output torque T is calculated according to the equation $T=T_1+(T_2-T_1)\times\text{Gain}$; and if the vehicle is not in uphill mode, then the output torque T is calculated according to the equation $T=T_2\times\text{Gain}$. $T_2$ may be consulted from the external characteristic curve of the motor according to the current vehicle speed value V of the vehicle.

In yet another embodiment, the motor controller further comprises: a comparing unit, configured to compare the current vehicle speed value V with a speed threshold $V_0$ and 0 respectively, and provide the results of comparisons to the calculator; and wherein the calculating unit is further configured to calculate the minimum torque $T_1$ according to the result of comparisons and the following equation:

$$T_1 = \begin{cases} 0; & \text{if } V > V_0 \\ -\left(1 - \frac{V - V_0}{V_0}\right) \times T_0; & \text{if } 0 \le V \le V_0 \\ -T_0; & \text{if } V < 0 \end{cases}.$$

According to the apparatus of the present invention, further comprising: a gear position sensor, for detecting gear position of the vehicle and outputting a gear position signal to a gear position detecting unit; the motor controller further comprises the gear position detecting unit, for receiving the gear position signal, obtaining a current gear position based on the gear position signal, determining whether the current gear position is at forward gear or neutral or otherwise, and outputting an active signal to the calculating unit if the current gear position is at forward gear or neutral; and the calculating unit is further configured to be actived for operating when receiving the active signal.

The present invention brings following advantages in that: when the vehicle is in uphill mode, the minimum torque $T_1$ for preventing the vehicle from slipping backward be calculated according to the current vehicle speed value V and the total mass of the vehicle, and output torque T will be calculated by taking the effect of the accelerator-pedal travel value Gain into account, even if the accelerator-pedal travel value is zero. The output torque T of the motor may not less than the minimum torque $T_1$, thus it may prevent the vehicle from slipping backward in uphill mode, so it will improve the vehicles' security and comfort.

BRIEF DESCRIPTIONS OF THE DRAWINGS

A more detailed understanding of the invention may be had from the following description, given by way of example and to be understood in conjunction with the accompanying drawings, wherein.

DETAILED DESCRIPTION OF THE PREFERRED EMBODIMENTS

Figure 1:
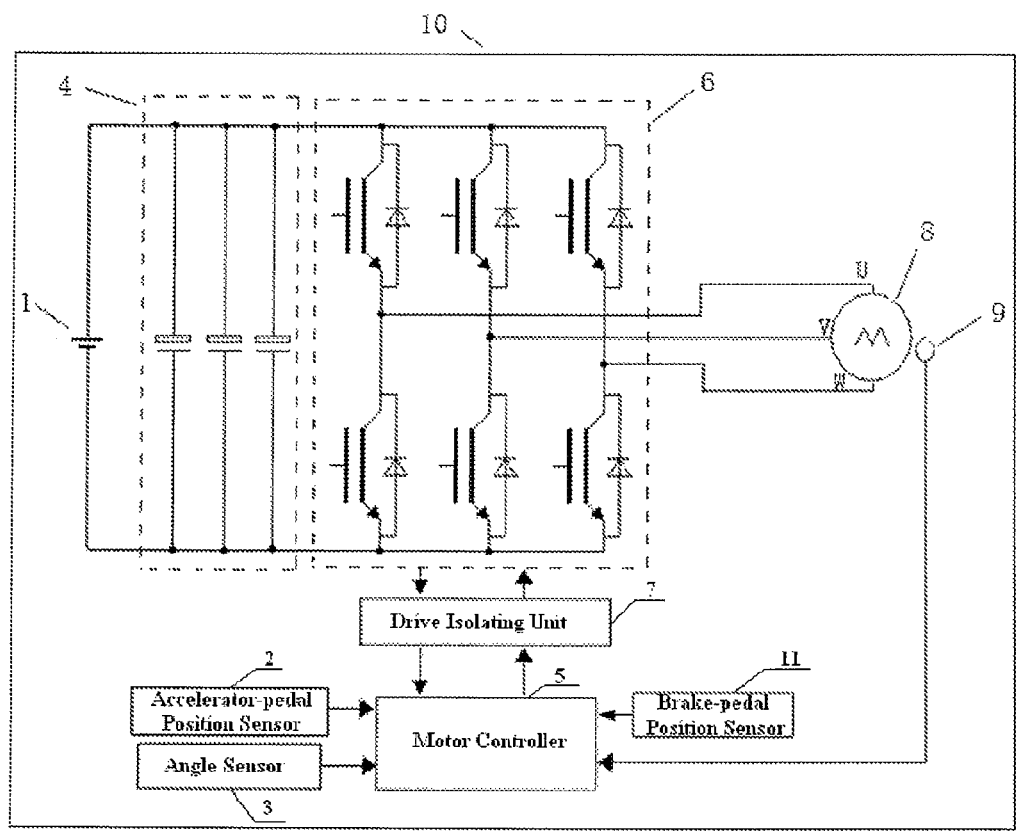
FIG. 1 shows a simplified structural view of an electric drive apparatus for electric vehicle in accordance with an embodiment of the invention.

As FIG. 1, it shows a simplified structural view of an electric drive system 10 for electric vehicle in accordance with an embodiment of the invention. As shown in FIG. 1, the electric drive system 10 comprises a battery set 1, an accelerator-pedal position sensor 2, a brake-pedal position sensor 11, an angle sensor 3, a capacitor set 4, a motor controller 5, an inverter 6, a drive isolating unit 7, a motor 8, and a rotary transformer 9.

Wherein the battery set 1 may adopt the high power battery set, the voltage of which is 200V~330V, and the battery set 1 is the energy for the whole electric drive system. The accelerator-pedal position sensor 2 and the brake-pedal position sensor 11 are installed at the places as that for conventional vehicles, for detecting and sending an accelerator-pedal position signal and a brake-pedal position signal to the motor controller 5 respectively. The angle sensor 3 is installed on the chassis of the whole vehicle, for detecting and outputting a tilt angle signal to the motor controller 5. In particular, when the motor controller 5 receives the angle signals, firstly smoothing the angle signals to remove the interference in the signals, and then determining whether the vehicle is in uphill mode or not based on the processed angle signals. The positive pole of capacitor set 4 is connected with the positive bus of the battery set 1, and its negative pole is connected with the negative bus of the battery set 1, for absorbing the high frequency surge voltage and smoothing the DC voltage waveform. The motor controller 5 is for calculating Pulse Width Modulation (PWM) signals and sending them to the inverter 6 through the drive isolating unit 7. The inverter 6 comprises three intelligent power modules (IPM), or such power devices as IGBT and transistor etc. Each IPM has the upper and lower arm, and the input terminal of upper arms of three IPMs may be connected with the positive bus of the battery set 1, while their lower arms may be connected with the negative bus of the battery set 1. All contacts of IPMs shall be respectively connected with 3-phase coils (i.e. U-phase, V-phase, and W-phase) of the motor 8. The motor 8 is a permanent-magnet synchronous motor, as the power output source of electric vehicle. The rotary transformer 9 is for detecting the rotating angle of rotor of motor 8, and sending to the motor controller 5 after a revolving decoding unit (not shown) decoding. The rotary transformer 9 and the revolving decoding unit can used as a vehicle speed sensor, and the current vehicle speed V could be calculated according to the positions of the rotor. Certainly, an individual vehicle speed sensor may be used.

The method of the present invention calculates the required output torque T based on the accelerator-pedal travel value Gain corresponding to the step depth of the accelerator pedal and the current vehicle speed value V. The motor controller 5 of the vehicle may calculate the minimum torque $T_1$ required for preventing the vehicle from slipping backward under the tilt angle according to the tilt angle value θ sensed by the tilt angle sensor 3 and the total mass and the current vehicle speed value V, based on the minimum torque $T_1$ and taking the accelerator-pedal travel value Gain and current vehicle speed value V into account, calculate the addition item of the output torque, add the items may get the output torque T.

Figure 2:
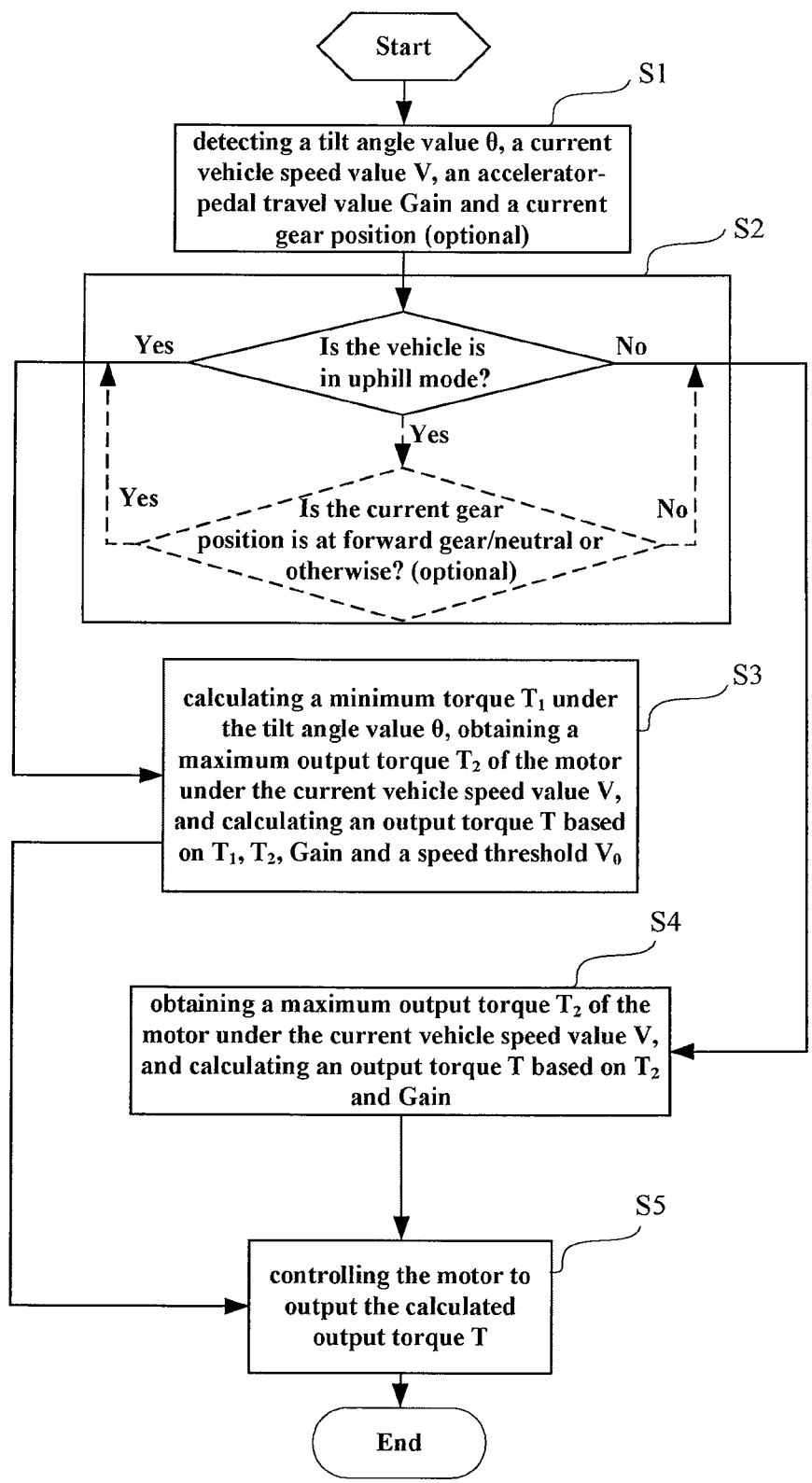
FIG. 2 is a flow chart of the method for controlling output torque of a motor in accordance with an embodiment of the invention.
Figure 3:
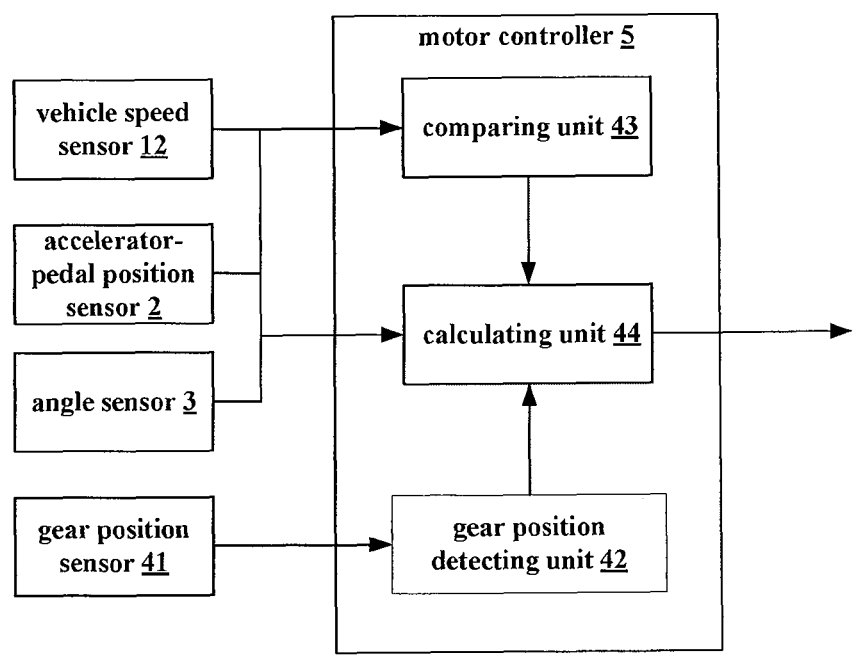
FIG. 3 is a structural diagram of the apparatus for controlling output torque of a motor in accordance with an embodiment of the invention.

As shown in FIG. 2, the method for controlling the output torque of a motor for an electric vehicle in uphill mode comprises the following steps:

In step S1, detecting tilt angle of the vehicle by the angle sensor 3, detecting current vehicle speed by the vehicle speed sensor 12 (shown in FIG. 3), detecting position of the accelerator-pedal by the accelerator-pedal position sensor 2, and optionally detecting current gear position by the gear position sensor 41 (shown in FIG. 3). Then motor controller 5 may obtain the tilt angle value θ, the current vehicle speed value V, the accelerator-pedal travel value Gain and/or the current gear position.

In step S2, the motor controller 5 determines whether the vehicle is in uphill mode based on the title angle value θ. If the detected tilt angle value θ is positive, determining the vehicle is in uphill mode. In general, in the case that the included angle between the line from the rear end of the vehicle to its front end and the horizontal line is an obtuse angle, it is defined that the title angle value is negative, otherwise it is positive. Then if the title angle value θ is positive, it indicates that the vehicle is in uphill mode. If it is determined that the vehicle is in uphill mode, then going to step S3, otherwise going to step S4.

In step S2, the uphill mode may be further confirmed based on the current gear position, as the dashed shown in FIG. 2. According to the alternative embodiment, if the detect current gear position is at forward gear or neutral, it illustrates that the vehicle is in uphill mode now. When detecting the current gear position, the flow of step S2 is executed as indicated by the dashed lines.

In step S3, corresponding to the uphill mode, the motor controller 5 may calculate the minimum torque $T_1$ required for preventing the vehicle from slipping backward under the tilt angle value θ according to the detected tilt angle value θ, the current vehicle speed value V and combined with the total mass of the vehicle to calculate the maximum output torque $T_2$ of the motor under the current vehicle speed value V. The minimum torque $T_1$ for preventing the vehicle from slipping backward under the tilt angle θ may be calculated according to the component of gravity of the vehicle along the slope direction, and converting the component to the relevant torque of motor and takes its negative value, that is, the minimum torque $T_1$ is the reverse torque of torque $T_0$.

Here provided two manners for calculating the minimum torque $T_1$. One is directly takes the reverse torque of the torque generated by the gravity of vehicle on its back running direction as the minimum torque $T_1$ (i.e. $T_1=-T_0$) the gravity torque along the back running direction of the vehicle may be calculated according to the equation below:

$$T_0 = mg\sin\theta \times \frac{r}{k}$$

wherein m is total mass of the vehicle, g is the gravity acceleration, θ is the tilt angle value of the vehicle, r is radius of the wheels and k is a variable transmission ratio of the gearbox.

Another manner is: comparing the current vehicle speed value V with a speed threshold $V_0$ and 0 respectively, and the minimum torque $T_1$ is calculated according to the result of comparisons and the following equation. If the current vehicle speed value is less than the speed threshold, then it deemed that the vehicle will slip backward in the current uphill mode, and the apparatus may calculate the torque to be given according to speed.

According to the result of comparisons, there may be divided into three cases:

1) If $V>V_0$, then $T_1=0$ and the actual output torque T of the motor is $T=T_2 \times$Gain, that is, under this speed, no additional output torque of the motor is required, only the output torque according to the accelerator-pedal travel value signal will avoid the backward slip of the vehicle.

2) If $0 \leq V \leq V_0$, then $$T_1 = -\left(1 - \frac{V - V_0}{V_0}\right) \times T_0, \text{ wherein } T_0 = mg\sin\theta \times \frac{r}{k},$$

the output torque of the motor is $T=-T_1+(T_2-T_1)\times$Gain.

3) If $V<0$, then $T_1$ is the torque generated by the gravity of the vehicle on its back running direction, so $T_1=-T_0$, then $T=T_1+(T_2-T_1)\times$Gain. However, due to $$T_0 > \left(1 - \frac{V - V_0}{V_0}\right) \times T_0$$

so in order to overcome the torque causing the backward slip of the vehicle generated by the gravity of vehicle in uphill mode, when the vehicle has a suitable speed, the torque to be output by the motor is lower, while the vehicle slips backward, the torque to be output by motor is higher.

The speed threshold $V_0$ is determined according to the experiments, preferred as 10 km/h. If it sets much lower than 10 km/h, the increasing of torque may cause the torque impact. If it sets much higher than 10 km/h, the increasing of torque may cause the speed keeping very high in uphill mode.

The maximum output torque $T_2$ of the motor depends on the external characteristic curve of the motor. With different speeds, the maximum output torque $T_2$ of the motor is different, according to the relationship between the maximum output torque $T_2$ and speed of motor, under a special speed, the maximum output torque $T_2$ is also a special value. Generally, the maximum output torque $T_2$ is more than the minimum torque $T_1$ In step S3, the calculation method for the output torque T of the motor is as below:

Taking the minimum torque $T_1$ as the start point, and taking the maximum torque $T_2$ corresponding to the point where the accelerator-pedal travel value Gain reaches its maximum value under the current motor rotary speed as the final point, draw a curve with the output torque T as the Y-axis and accelerator-pedal travel value Gain as the X-axis. The minimum output torque value on this curve is the required minimum torque $T_1$, and its maximum value is $T_2$ which is corresponding to the maximum accelerator-pedal travel value Gain. The output torque T may be linearly increased with the increasing of accelerator-pedal travel value Gain, when the accelerator-pedal travel value Gain reaches its maximum value, the output torque T may reach its maximum value $T_2$.

The calculate equation is as below:

$$T=T_1+(T_2-T_1)\times Gain$$

In step S4, corresponding to the mode that is not uphill mode, the motor controller 5 may calculate the output torque T of the motor according to the equation $T=T_2\times Gain$.

In step S5, the motor controller 5 may output corresponding PWM control signals according to the calculated output torque T of the motor, and output to the inverter 6 and the inverter 6 may control the motor to output the corresponding torque.

The apparatus structural diagram for realizing the foresaid control method is shown as FIG. 3. Besides the angle sensor 3, the vehicle speed sensor 12, the accelerator-pedal position sensor 2, and the motor controller 5 mentioned above, further comprises a gear position sensor 41 (optional), and the motor controller 5 comprises a calculating unit 44, a comparing unit 43 and a gear position detecting unit 42 (optional).

The calculating unit 44 is configured to calculate the minimum torque $T_1$ according to the following equation $T_1=-T_0$, wherein $$T_0 = mg\sin\theta \times \frac{r}{k},$$

m is total mass of the vehicle, g is the gravity acceleration, θ is the tilt angle value of the vehicle, r is radius of the wheels and k is a variable transmission ratio of the gearbox.

The calculating unit is further configured to calculate the output torque T as follows: if the vehicle is in uphill mode, then the output torque T is calculated according to the equation $T=T_1+(T_2-T_1)\times Gain$; and if the vehicle is not in uphill mode, then the output torque T is calculated according to the equation $T=T_2\times Gain$.

The comparing unit 43 is configured to compare the current vehicle speed value V with a speed threshold $V_0$ and 0 respectively, and provide the results of comparisons to the calculator; and the calculating unit is further configured to calculate the minimum torque $T_1$ according to the result of comparisons and the following equation:

$$T_1 = \begin{cases} 0; & \text{if } V > V_0 \\ -\left(1 - \dfrac{V - V_0}{V_0}\right) \times T_0; & \text{if } 0 \leq V \leq V_0 \\ -T_0; & \text{if } V < 0 \end{cases}.$$

Wherein the speed threshold $V_0$ is preferably 10 km/h.

When applying gear detecting, the gear position sensor 41 is for detecting gear position of the vehicle and outputting a gear position signal to a gear position detecting unit 42. And the gear position detecting unit 42 is for receiving the gear position signal, obtaining a current gear position based on the gear position signal, determining whether the current gear position is at forward gear or neutral or otherwise, and outputting an active signal to the calculating unit 44 if the current gear position is at forward gear or neutral; and the calculating unit 44 is further configured to be actived for operating when receiving the active signal.

According to the electric vehicle mentioned above, when the vehicle is on a slope which gear position is at forward gear, even if the driver completely releases the accelerator pedal, the apparatus can calculate the minimum torque $T_1$ for preventing the vehicle from slipping backward. The motor may output the torque which may prevent the vehicle from slipping backward. When the driver steps on the accelerator pedal, through the position of accelerator-pedal travel value Gain in the curve (torque vs accelerator-pedal travel value curve), the output torque can be calculated, this output torque will be greater than the minimum output torque $T_1$, and less than or equal to the output torque $T_2$ under the current vehicle speed V with the maximum accelerator-pedal travel value Gain.

I claim:

1. A method for controlling output torque of an electric motor for an electric vehicle in an uphill mode, comprising steps of:
    S1) detecting a tilt angle value (θ), a current vehicle speed value (V), and an accelerator-pedal travel value (Gain) of the vehicle;
    S2) determining if the vehicle is in uphill mode;
    S3) if the vehicle is in an uphill mode, then calculating a minimum torque ($T_1$) required to prevent the vehicle from slipping backward based on the tilt angle value (θ) and the current vehicle speed value (V), obtaining a maximum output torque ($T_2$) of the motor based on the current vehicle speed value (V), calculating an output torque (T) of the motor based on the minimum torque ($T_1$) and the maximum output torque ($T_2$) and the accelerator-pedal travel value (Gain), and controlling an output of the motor based on the calculated output torque (T);
    S4) if the vehicle is not in an uphill mode, calculating a maximum output torque ($T_2$) of the motor under the current vehicle speed value (V), calculating an output torque T of the motor based on the maximum output torque ($T_2$) and the accelerator-pedal travel value (Gain), and controlling an output of the motor based on the calculated output torque (T); and wherein the output torque (T) of the motor is calculated in step S3 according to the equation: $T=T_1+(T_1-T_1)*Gain$, and wherein the output torque (T) of the motor is calculated in S4 according to the equation: $T=T_2*Gain$.

2. The method of claim 1, wherein the minimum torque $T_1$ is calculated according to the equation: $T_1=-T_0$, wherein $T_0=mg*\sin(\theta)*(r/k)$, and wherein,
m=total mass of the vehicle;
g=gravitational constant;
r=wheel radius;
k=a variable transmission ratio of a gearbox disposed between the motor and the wheel.

3. The method of claim 1, wherein step S3 further includes the step of comparing the current vehicle speed value (V) with a speed threshold $V_0$ and a zero value, respectively, wherein the minimum torque $T_1$ is calculated according to the equation:

$$T_1 = \begin{cases} 0; & \text{if } V > V_0 \\ -\left(1-\dfrac{V-V_0}{V_0}\right) \times T_0; & \text{if } 0 \leq V \leq V_0 \\ -T_0; & \text{if } V < 0 \end{cases}$$

wherein $T_0=mg*\sin(\theta)*(r/k)$; and wherein
m=total mass of the vehicle;
g=gravitational constant;
r=wheel radius;
k=a variable transmission ratio of a gearbox disposed between the motor and the wheel.

4. The method of claim 3, wherein the speed threshold $V_0$ is 10 km/h.

5. The method of claim 1, wherein the vehicle is determined to be in an uphill mode if the tilt angle value (θ) is positive.

6. The method of claim 5, further including
detecting a current gear position of the vehicle;
performing step S3 if the vehicle is in the uphill mode and the current gear position is in a forward or neutral position; and
performing step S4 if the vehicle is not in the uphill mode or the current gear position is not in a forward or neutral position.

7. A computer readable memory or data storage means encoded with data representing a computer program for system for controlling output torque of an electric motor for an electric vehicle in an uphill mode, the computer readable memory or data storage means causing a computer to perform the acts of:
S1) detecting a tilt angle value (θ), a current vehicle speed value (V), and an accelerator-pedal travel value (Gain) of the vehicle;
S2) determining if the vehicle is in uphill mode;
S3) if the vehicle is in an uphill mode, then calculating a minimum torque ($T_1$) required to prevent the vehicle from slipping backward based on the tilt angle value (θ) and the current vehicle speed value (V), obtaining a maximum output torque ($T_2$) of the motor based on the current vehicle speed value (V), calculating an output torque (T) of the motor based on the minimum torque ($T_1$) and the maximum output torque ($T_2$) and the accelerator-pedal travel value (Gain), and controlling an output of the motor based on the calculated output torque (T);
S4) if the vehicle is not in an uphill mode calculating a maximum output torque ($T_2$) of the motor under the current vehicle speed value (V), calculating an output torque T of the motor based on the maximum output torque ($T_2$) and the accelerator-pedal travel value (Gain), and controlling an output of the motor based on the calculated output torque (T); and
wherein the output torque (T) of the motor is calculated in step S3 according to the equation: $T=T_1+(T_2-T_1)*Gain$, and wherein the output torque (T) of the motor is calculated in step S4 according to the equation: $T=T_2*Gain$.

8. An apparatus for controlling output torque of an electric motor for an electric vehicle in an uphill mode, comprising:
a motor controller;
an angle sensor configured to determine a tilt angle value (θ), and output the tilt angle value (θ) to the motor controller;
a vehicle speed sensor configured to determine a current vehicle speed value (V), and output the current vehicle speed value (V) to the motor controller;
an accelerator-pedal position sensor configured to determine a position of an accelerator pedal, and output an accelerator-pedal travel value (Gain) to the motor controller;
the motor controller further configured to:
determine if the vehicle is in uphill mode based on the tilt angle value (θ), the current vehicle speed value (V), and the accelerator-pedal travel value (Gain);
if the vehicle is in an uphill mode, then calculate a minimum torque ($T_1$) required to prevent the vehicle from slipping backward based on the tilt angle value (θ) and the current vehicle speed value (V), obtain a maximum output torque ($T_2$) of the motor based on the current vehicle speed value (V), calculate an output torque (T) of the motor based on the minimum torque ($T_1$) and the maximum output torque ($T_2$) and the accelerator-pedal travel value (Gain), and generate a control signal configured to control an output of the motor based on the calculated output torque (T);
if the vehicle is not in an uphill mode, then calculate a maximum output torque ($T_2$) of the motor under the current vehicle speed value (V), calculate an output torque T of the motor based on the maximum output torque ($T_2$) and the accelerator-pedal travel value (Gain), and generate a control signal configured to control an output of the motor based on the calculated output torque (T)
wherein the motor controller comprises a calculating unit configured to calculate the minimum torque $T_1$ according to the equation: $T_1=-T_0$, wherein $T_0=mg*\sin(\theta)*(r/k)$, wherein,
m=total mass of the vehicle;
g=gravitational constant;
r=wheel radius;
k=a variable transmission ratio of a gearbox disposed between the motor and the wheel; and
wherein the calculating unit is configured to calculate the output torque (T) according to the equation: $T=T_1(T_2-T_1)*(Gain)$ if the vehicle is in an uphill mode; and calculate the output torque (T) according to the equation $T=T_2*(Gain)$ if the vehicle is not in an uphill mode.

9. The apparatus of claim 8, wherein the motor controller further comprises a comparing unit configured to compare the current vehicle speed value (V) with a speed threshold $V_0$ and a zero value, respectively, and provides the results of comparisons to the calculating unit; and wherein the calculating unit calculates the minimum torque $T_1$ according to the results of the comparison and according to the equation:

$$T_1 = \begin{cases} 0; & \text{if } V > V_0 \\ -\left(1-\dfrac{V-V_0}{V_0}\right) \times T_0; & \text{if } 0 \leq V \leq V_0 \\ -T_0; & \text{if } V < 0 \end{cases}$$

10. The apparatus of claim 9, wherein the speed threshold ($V_0$) is 10 km/h.

11. The apparatus of claim 8, further comprising:
- a gear position sensor configured to detect a gear position of the vehicle, and output a gear position signal to a gear position detecting unit;
- the gear position detecting unit configured to determine a current gear position based on the gear position signal, determine if the current gear position is in a forward gear or a neutral gear; and
- output an active signal to the calculating unit if the current gear position is in a forward gear position or a neutral gear position.

* * * * *

UNITED STATES PATENT AND TRADEMARK OFFICE
CERTIFICATE OF CORRECTION

PATENT NO. : 8,478,467 B2  Page 1 of 1
APPLICATION NO. : 12/520168
DATED : July 2, 2013
INVENTOR(S) : Xiaohua Tang It is certified that error appears in the above-identified patent and that said Letters Patent is hereby corrected as shown below:

In the Claims

In column 9, claim 1, line 2, after "$T=T_1+$" replace "$(T_1-T_1)$" with --$(T_2-T_1)$--.

In column 9, claim 1, line 4, before "S4 according to the" insert --step--.

Signed and Sealed this
Twenty-second Day of April, 2014

Michelle K. Lee
*Deputy Director of the United States Patent and Trademark Office*